(12) United States Patent
Ikeno

(10) Patent No.: US 8,058,381 B2
(45) Date of Patent: Nov. 15, 2011

(54) LIQUID CURABLE FLUOROSILICONE COMPOSITION AND PRODUCTION METHOD THEREOF

(75) Inventor: Masayuki Ikeno, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 12/722,268

(22) Filed: Mar. 11, 2010

(65) Prior Publication Data

US 2010/0234551 A1 Sep. 16, 2010

(30) Foreign Application Priority Data

Mar. 12, 2009 (JP) ................................. 2009-059205

(51) Int. Cl.
*C08G 77/24* (2006.01)
(52) U.S. Cl. ............................................. 528/36; 528/42
(58) Field of Classification Search .................. None
See application file for complete search history.

(56) References Cited

U.S. PATENT DOCUMENTS

| | | | |
|---|---|---|---|
| 4,029,629 A | | 6/1977 | Jeram |
| 4,032,502 A | | 6/1977 | Lee et al. |
| 4,041,010 A | | 8/1977 | Jeram |
| 4,087,585 A | | 5/1978 | Schulz |
| 4,360,610 A | * | 11/1982 | Murray et al. ............... 523/212 |
| 4,529,752 A | | 7/1985 | Bluestein |
| 4,539,357 A | * | 9/1985 | Bobear .......................... 524/267 |
| 4,753,978 A | * | 6/1988 | Jensen ........................... 524/862 |
| 4,771,119 A | * | 9/1988 | Wrobel .......................... 528/15 |
| 4,842,943 A | * | 6/1989 | Kobayashi et al. ........... 428/447 |
| 5,118,754 A | * | 6/1992 | Miyakoshi et al. ........... 524/731 |
| 5,254,623 A | | 10/1993 | Watson |
| 5,288,795 A | * | 2/1994 | Fujiki et al. .................. 524/731 |
| 5,380,811 A | * | 1/1995 | Kishita et al. ................ 528/15 |
| 5,547,759 A | * | 8/1996 | Chen et al. ................... 428/421 |
| 5,643,973 A | * | 7/1997 | Miyabayashi ................ 523/212 |
| 5,679,727 A | * | 10/1997 | Griffith et al. ............... 523/213 |
| 5,861,448 A | * | 1/1999 | Griffith et al. ............... 523/213 |
| 5,908,592 A | * | 6/1999 | Kimura et al. ............... 264/102 |
| 5,916,090 A | | 6/1999 | Itagaki et al. |
| 5,925,709 A | * | 7/1999 | Takahashi et al. ............ 524/493 |
| 6,031,026 A | * | 2/2000 | Tateyama et al. ............ 523/340 |
| 6,339,124 B1 | * | 1/2002 | Igarashi et al. ............... 524/588 |
| 6,372,860 B1 | * | 4/2002 | Miyoshi et al. ............... 525/477 |
| 6,780,919 B2 | * | 8/2004 | Ikeno et al. ................... 524/493 |

FOREIGN PATENT DOCUMENTS

| | | |
|---|---|---|
| JP | 53-35983 | 4/1978 |
| JP | 57-182353 A | 11/1982 |
| JP | 59-31542 A | 2/1984 |
| JP | 59-80464 A | 5/1984 |
| JP | 60-27691 A | 2/1985 |
| JP | 4-236265 A | 8/1992 |
| JP | WO 2008/055998 A1 | 5/2008 |
| JP | 2009-91449 A | 4/2009 |

OTHER PUBLICATIONS

European Search Report dated Apr. 16, 2010, for European Application No. 10002578.2.

* cited by examiner

*Primary Examiner* — Robert Loewe

(74) *Attorney, Agent, or Firm* — Birch, Stewart, Kolasch & Birch, LLP

(57) ABSTRACT

A liquid curable fluorosilicone composition having improved defoamability is provided. The composition comprises (A) an organopolysiloxane having a viscosity at 25° C. of 100 to 500,000 mPa·s and represented by the following formula:

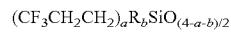

$(CF_3CH_2CH_2)_a R_b SiO_{(4-a-b)/2}$ wherein R is a monovalent hydrocarbon group with the proviso that at least 0.001% by mole of the hydrocarbon group is an alkenyl group, a is 0.1 to 1.0, b is 2.5 to 1.0, and a+b is 1.8 to 3.0, (B) an organohydrogenpolysiloxane containing at least two hydrogen atoms bonded to the silicon atom in a molecule, (C) an addition catalyst, and (D) a diorganopolysiloxane having a viscosity at 25° C. of 1 to 10,000 mPa·s which does not comprise trifluoropropyl group but comprises dimethylsiloxane unit.

8 Claims, No Drawings

LIQUID CURABLE FLUOROSILICONE COMPOSITION AND PRODUCTION METHOD THEREOF

CROSS-REFERENCE TO RELATED APPLICATION

This non-provisional application claims priority under 35 U.S.C. §119(a) on Patent Application No. 2009-059205 filed in Japan on Mar. 12, 2009, the entire contents of which are hereby incorporated by reference.

TECHNICAL FIELD

This invention relates to a curable fluorosilicone composition, and more specifically, to a liquid curable fluorosilicone composition having excellent defoamability. This invention also relates to a method for producing such liquid curable fluorosilicone composition.

BACKGROUND ART

Fluorosilicone elastomer compositions have been used for aircraft and automobile rubber parts in view of their high resistance to gasoline and oils. Fluorosilicone elastomer compositions have also been used as a protective material for elements of an air amount sensor for fuel injection control in automobiles, a gasoline vapor pressure sensor in a gasoline tank, and a liquid and gas pressure sensor in fuel feeding systems.

Various curable fluorosilicone compositions for such applications has been disclosed, for example, in JP-B 53-35983, JP-B 59-31542, and JP-B 60-27691 as well as JP-A 57-182353 and JP-A 59-80464.

However, fluorosilicone polymers suffer from the drawback of extremely poor defoamability. For example, in the case of a two part curable fluorosilicone composition, the composition is used by mixing the base component and the curing agent at a predetermined mixing ratio before its use, and the bubbles entrained in the mixing should be completely removed by means such as vacuum deaeration. In the meanwhile, one part curable fluorosilicone composition not requiring such mixing before its use suffered from the problem of bubbles remaining in the potting layer when used for the potting of a substrate for electric/electronic parts since removal of bubbles caused by the gap in the board had been difficult.

SUMMARY OF THE INVENTION

The present invention has been made in view of the situation as described above, and an object of the present invention is to provide a liquid curable fluorosilicone composition having excellent defoamability. Another object of the present invention is to provide the production method thereof.

In order to realize the objects as described above, the inventors of the present invention made an intensive study and found that a liquid curable fluorosilicone composition has an excellent defoamability, which is prepared by adding a particular amount of (D) a diorganopolysiloxane having a viscosity at 25° C. of 1 to 10,000 mPa·s which does not contain trifluoropropyl group but contains dimethylsiloxane unit to a liquid curable fluorosilicone composition comprising (A) an organopolysiloxane having a viscosity at 25° C. of 100 to 500,000 mPa·s represented by the following average compositional formula:

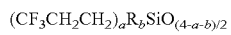

wherein R is a monovalent hydrocarbon group of 1 to 8 carbon atoms with the proviso that at least 0.001% by mole is an alkenyl group, a is 0.1 to 1.0, b is 2.5 to 1.0, and a+b is 1.8 to 3.0:100 parts by weight; (B) an organohydrogenpolysiloxane containing at least 2 hydrogen atoms bonded to the silicon atom per molecule; and (C) an addition catalyst has an improved defoamability. This invention has been completed on the bases of such finding.

Accordingly, the present invention provides a liquid curable fluorosilicone composition and production method thereof as described below.

[1] A liquid curable fluorosilicone composition comprising
  (A) 100 parts by weight of an organopolysiloxane having a viscosity at 25° C. of 100 to 500,000 mPa·s and represented by the following average compositional formula:

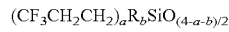

wherein R is a monovalent hydrocarbon group of 1 to 8 carbon atoms with the proviso that at least 0.001% by mole of the hydrocarbon group is an alkenyl group, a is 0.1 to 1.0, b is 2.5 to 1.0, and a+b is 1.8 to 3.0,
  (B) an organohydrogenpolysiloxane containing at least two hydrogen atoms bonded to the silicon atom in a molecule in an amount such that number of the hydrogen atom bonded to the silicon atom in the component (B) is 0.5 to 10 per one alkenyl group bonded to the silicon atom in the component (A),
  (C) a catalytic amount of an addition catalyst, and
  (D) 0.001 to 5 parts by weight of a diorganopolysiloxane having a viscosity at 25° C. of 1 to 10,000 mPa·s which does not comprise trifluoropropyl group but comprises dimethylsiloxane unit.

[2] A liquid curable fluorosilicone composition according to the above [1] wherein the component (D) is a compound selected from those represented by the following formulae:

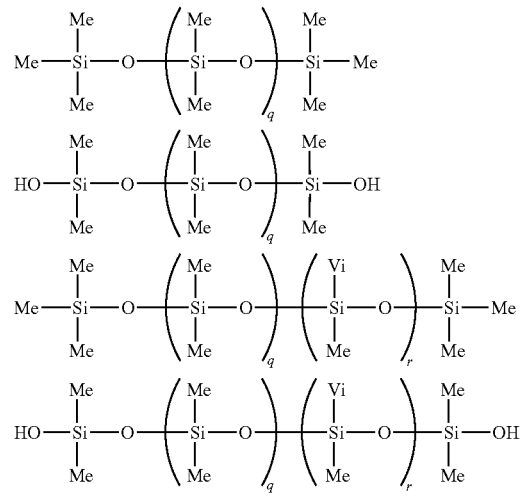

wherein Me is methyl group, Vi is vinyl group, q and r are independently an integer of at least 1 with the proviso that q and q+r are a number such that the viscosity of the composition at 25° C. is in the range of 1 to 10,000 mPa·s.

[3] A method for producing a liquid curable fluorosilicone composition comprising
  (A) 100 parts by weight of an organopolysiloxane having a viscosity at 25° C. of 100 to 500,000 mPa·s represented by the following average compositional formula:

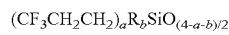

wherein R is a monovalent hydrocarbon group of 1 to 8 carbon atoms with the proviso that at least 0.001% by mole is an alkenyl group, a is 0.1 to 1.0, b is 2.5 to 1.0, and a+b is 1.8 to 3.0, (B) an organohydrogenpolysiloxane containing at least 2 hydrogen atoms bonded to the silicon atom in a molecule in an amount such that number of the hydrogen atom bonded to the silicon atom in the component (B) is 0.5 to 10 per one alkenyl group bonded to the silicon atom in the component (A), and (C) an catalytic amount of an addition catalyst, wherein (D) a diorganopolysiloxane having a viscosity at 25° C. of 1 to 10,000 mPa·s which does not comprise trifluoropropyl group but comprises dimethylsiloxane unit is added as a defoaming agent to the components (A) to (C) in an amount of 0.001 to 5 parts by weight per 100 parts by weight of component (A), and after its addition, the composition is defoamed in a defoaming device.

ADVANTAGEOUS EFFECTS OF INVENTION

The liquid curable fluorosilicone composition of the present invention has a markedly improved defoamability simultaneously with the gasoline resistance and chemical resistance inherent to the fluorosilicone composition at the level equivalent to those of the conventional fluorosilicone compositions.

DETAILED DESCRIPTION OF THE INVENTION

The liquid curable fluorosilicone composition of the present invention comprises the following components (A) to (D).

(A) Organopolysiloxane

The component (A) is the main component of the present invention, and this component (A) is represented by the following average compositional formula:

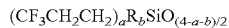

$(CF_3CH_2CH_2)_a R_b SiO_{(4-a-b)/2}$ wherein R is a monovalent hydrocarbon group of 1 to 8 carbon atoms with the proviso that at least 0.001% by mole of the hydrocarbon group is an alkenyl group, a is 0.1 to 1.0, b is 2.5 to 1.0, and a+b is 1.8 to 3.0.

In the above formula, R is a monovalent hydrocarbon group of 1 to 8 carbon atoms, and exemplary such monovalent hydrocarbon groups include alkyl groups such as methyl group, ethyl group, propyl group, isopropyl group, butyl group, isobutyl group, tert-butyl group, pentyl group, neopentyl group, hexyl group, cyclohexyl group, octyl group, nonyl group, and decyl group, aryl groups such as phenyl group, tolyl group, xylyl group, and naphthyl group, aralkyl groups such as benzyl group, phenylethyl group, and phenyl propyl group, and alkenyl group such as vinyl group, allyl group, propenyl group, isopropenyl group, butenyl group, hexenyl group, cyclohexenyl group, and octenyl group. Among these, the preferred are methyl group and vinyl group.

It is also required that at least 0.001% by mole, preferably 0.001 to 10% by mole, and more preferably 0.01 to 5% by mole of the entire organic group bonded to the silicon atom, namely, R+(CF$_3$CH$_2$CH$_2$) is an alkenyl group, and preferably vinyl group. When the amount of the alkenyl group is less than 0.001% by mole, the composition will suffer from insufficient curability, while excessive content of the alkenyl group may result in a brittle cured composition. The alkenyl group may be bonded to the silicon atom at the end of the molecular chain and/or to the silicon atom at the side chain of the molecular chain.

a is a positive number of 0.1 to 1.0, and preferably 0.2 to 1.0; b is a positive number of 2.5 to 1.0, and preferably 2.1 to 1.0; and a+b is 1.8 to 3.0, and preferably 1.9 to 2.3. When a is less than 0.1, the composition after curing will suffer from insufficient oil resistance and solvent resistance, while a in excess of 1.0 will result in the difficulty of industrial-scale production.

The organopolysiloxane may have a straight, partially branched straight, cyclic, branched cyclic, or three dimensional network molecular structure. However, the organopolysiloxane basically comprises a straight-chain diorganopolysiloxane having a backbone of repeating diorganosiloxane units terminated with a triorganosiloxy group at both ends. The organopolysiloxane may also partially comprise a branched, cyclic, or three dimensional network structure as long as the composition after curing has rubber elasticity.

An exemplary organopolysiloxane is the one having a backbone comprising methyltrifluoropropylsiloxy group as the essential unit and dimethylsiloxy group, methylvinylsiloxy group, or the like as an optional unit with the ends capped with trimethylsilyl group, dimethylvinylsilyl group, methyldivinylsilyl group, trivinylsilyl group, or the like. Exemplary such organopolysiloxanes include those represented by the following formulae:

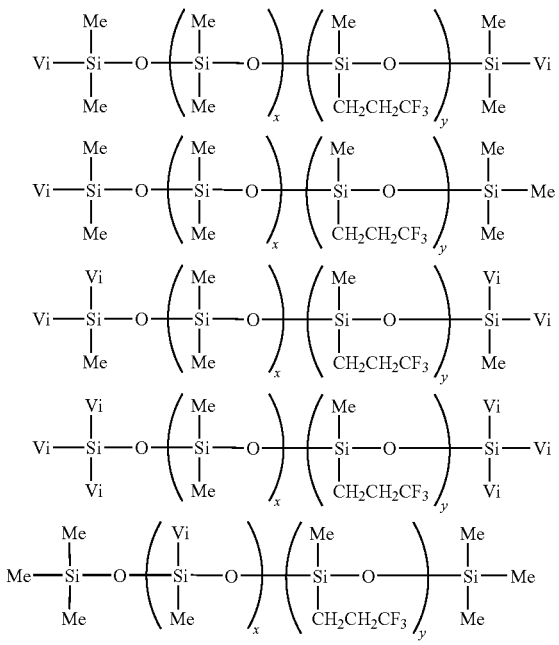

wherein x is at least 0; y and z are at least 1; x+y and y+z are an integer such that the viscosity at 25° C. is 100 to 500,000 mPa·s). These organopolysiloxanes may be used alone or in combination of two or more which have different degree of polymerization or molecular structure.

This organopolysiloxane has a degree of polymerization such that viscosity at 25° C. is in the range of 100 to 500,000 mPa·s.

Component (A) have a viscosity at 25° C. of 100 to 500,000 mPa·s, and preferably 300 to 100,000 mPa·s in view of realizing the favorable physical properties of the cured product and workability of the composition. The cured product will suffer from insufficient strength when the viscosity at 25° C. is less than 100 mPa·s, while the viscosity in excess of 500,000 mPa·s may result in the poor handling property. In the present invention, the viscosity may be measured, for example, by using a rotational viscometer (and this applies to the following description).

For improving the hydrocarbon solvent resistance, the content of the R(CH$_2$CH$_2$CF$_3$)SiO unit in the molecule is preferably at least 10% by mole, more preferably at least 20% by mole, and most preferably 30 to 100% by mole.

When the resulting silicone composition is to be used in producing a silicone rubber having low hardness such as a silicone gel, the organopolysiloxane containing trifluoropropyl group but no alkenyl group may be incorporated. Exemplary such organopolysiloxanes include those represented by the formula as described above in which the vinyl groups are substituted by methyl groups.

(B) Organohydrogenpolysiloxane

The component (B) is an organohydrogenpolysiloxane which acts as a crosslinking agent by hydrosililation addition with the component (A). The organohydrogenpolysiloxane of the component (B) may be used alone or in combination of two or more. The component (B) is not particularly limited for its molecular structure, and any desired organohydrogenpolysiloxane that has been produced in the art such as the one having a straight, cyclic, branched cyclic, or three dimensional network (resinous) structure may be used.

The organohydrogenpolysiloxane of the component (B) has at least 2, preferably 3 to 100, and most preferably 3 to 50 hydrogen atoms bonded to the silicon atom (namely, hydrosilyl group (SiH group)) in a molecule. When the organohydrogenpolysiloxane of the component (B) has a straight chain structure, these SiH groups may be located either at the end and/or at the side (non-terminal) of the molecular chain.

The group bonded to the silicon atom other than the hydrogen atom may be an unsubstituted or substituted monovalent hydrocarbon group containing no aliphatic unsaturated bond, and the same or different monovalent hydrocarbon groups may be present. Exemplary such monovalent hydrocarbon groups include alkyl groups such as methyl group, ethyl group, propyl group, isopropyl group, butyl group, isobutyl group, tert-butyl group, pentyl group, neopentyl group, hexyl group, cyclohexyl group, octyl group, nonyl group, and decyl group; aryl groups such as phenyl group, tolyl group, xylyl group, and naphthyl group; aralkyl groups such as benzyl group, phenylethyl group, and phenylpropyl group; and any of these groups in which a part or all of their hydrogen atoms are substituted by a halogen atom such as fluorine, bromine, or chlorine such as trifluoropropyl group. The preferred are methyl group and trifluoropropyl group.

The number of silicon atoms in a molecule (degree of polymerization) of the component (B) is preferably 2 to 300, more preferably 3 to 200, and most preferably 4 to 150.

In addition, the component (B) is liquid at room temperature (25° C.), and the component (B) may have a viscosity at 25° C. of 0.1 to 1,000 mPa·s, and preferably 0.5 to 500 mPa·s. Workability may be insufficient when the viscosity is either too high or too low.

Examples of the component (B) include the organohydrogenpolysiloxane represented by the following formula:

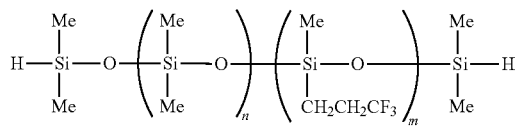

-continued

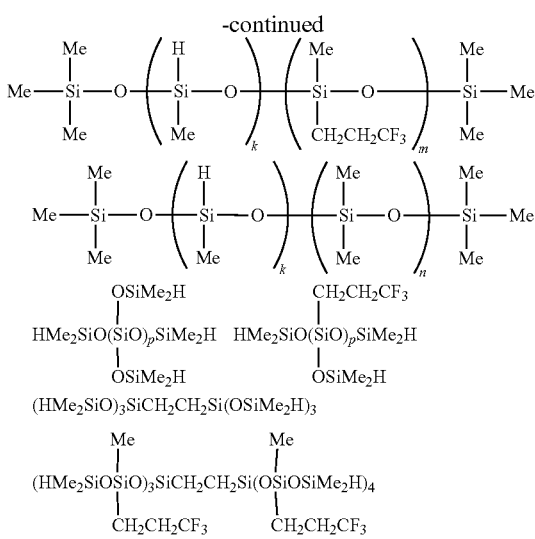

wherein k is an integer of at least 2, m and n are an integer of at least 0, m is preferably an integer of at least 1, and p is an integer of at least 1. These organohydrogenpolysiloxane may be used alone or in combination of two or more which have different degree of polymerization or molecular structure.

The component (B) is incorporated in an amount such that the number of the hydrogen atom bonded to the silicon atom in the component (B) is 0.5 to 10, and preferably 1 to 5 per one alkenyl group bonded to the silicon atom in the component (A). When incorporated in an amount such that the number of the hydrogen atom bonded to the silicon atom in the component (B) per one alkenyl group bonded to the silicon atom in the component (A) is less than 0.5, the resulting composition will not cure sufficiently. On the other hand, when incorporated in an amount such that the number of the hydrogen atom bonded to the silicon atom in the component (B) per one alkenyl group bonded to the silicon atom in the component (A) is in excess of 10, the resulting silicone rubber will suffer from drastically reduced heat resistance.

(C) Addition Catalyst

The component (C) is an addition catalyst which is not particularly limited as long as it promote addition reaction of the alkenyl group in the component (A) and the hydrogen atom bonded to the silicon atom in the component (B). Exemplary such catalysts include metals of the platinum group or their compounds such as platinum, palladium, rhodium, and the like; as well as chloroplatinic acid; alcohol-modified chloroplatinic acid; a coordination compound of chloroplatinic acid and an olefin, a vinyl siloxane, or an acetylene compound; tetrakis(triphenylphosphine)palladium; chlorotris (triphenylphosphine)rhodium; and the like. The most preferred are platinum-based compounds.

The component (C) may be used alone or in combination of two or more.

The component (C) may be incorporated in a catalytic amount, and preferably, the component (C) is incorporated in the range of 1 to 500 ppm, and more preferably 10 to 100 ppm in terms of the catalytic metal element per the total amount of the components (A) and (B). When used in such range, the addition will be promoted at an adequate reaction rate, and the resulting cured product will have an good heat resistance.

(D) Diorganopolysiloxane

The component (D) is a diorganopolysiloxane not containing any trifluoropropyl groups but containing dimethylsiloxane unit, and has a viscosity at 25° C. of 1 to 10,000 mPa·s.

This component can facilitate defoaming. The component (D) has a backbone comprising dimethylsiloxane unit as essential unit and a diorganosiloxane unit such as methylvinylsiloxane unit as an optional unit with the ends capped with a triorganosilyl group such as trimethylsilyl group or dimethylhydroxysilyl group. Exemplary organic group other than the methyl group are the same as the R as described above excluding methyl group, and exemplary diorganopolysiloxanes are those represented by the following formulae:

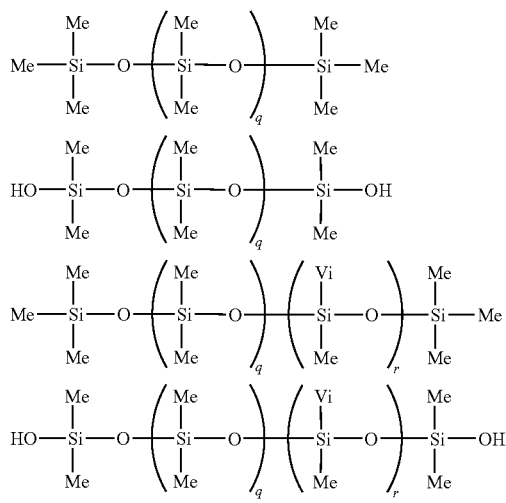

wherein q and r are at least 1, and q and q+r are respectively an integer such that the viscosity at 25° C. is in the range of 1 to 10,000 mPa·s. These diorganopolysiloxanes may be used alone or in combination of two or more.

The component (D) may have a viscosity at 25° C. in the range of 1 to 10,000 mPa·s, and preferably 5 to 100 mPa·s. The defoamability will be insufficient when the viscosity at 25° C. is less than 1 mPa·s or in excess of 10,000 mPa·s.

The dimethylorganopolysiloxane (D) is incorporated in an amount of 0.001 to 5 parts by weight, and preferably 0.001 to 1 part by weight per 100 parts by weight of component (A). The defoamability is not improved by incorporating in excess of 5 parts by weight, while incorporation at less than 0.001 part by weight results in an insufficient defoamability.

Preferably, fine powder silica (E) is incorporated in the composition of the present invention for reinforcement. More specifically, the fine powder silica imparts a high tear resistance to the cured composition, and the use of the fine powder silica (E) as the reinforcing agent enables the production of a cured product having a sufficient tear resistance.

The fine powder silica may preferably have a specific surface area (measured by BET method) of at least 50 m²/g, more preferably 50 to 400 m²/g, and most preferably 100 to 300 m²/g. When the specific surface area is less than 50 m²/g, the cured product may not enjoy a sufficient tear resistance.

The fine powder silica used in the present invention may be any known fine powder silica which has been used for reinforcing a silicone rubber as long as it has a specific surface area as specified above (of at least 50 m²/g). Exemplary such fine powder silica include fumed silica (dry silica) and precipitated silica (wet silica).

The fine powder silica may be used with no further treatment. However, it may also be used after treating with an organosilicon compound such as a methylchlorosilane such as trimethylchlorosilane, dimethyldichlorosilane, or methyltrichlorosilane; dimethylpolysiloxane; or a hexaorganodisilazane such as hexamethyldisilazane, divinyltetramethyldisilazane, or dimethyltetravinyldisilazane for providing good flowability with the composition.

Component (E) may be used alone or in combination of two or more.

The component (E) is preferably incorporated in an amount of up to 50 parts by weight, more preferably 1 to 50 parts by weight, and most preferably 5 to 40 parts by weight per 100 parts by weight of the organopolysiloxane (A). When incorporated in an excessively low amount, the resulting product may suffer from an insufficient tear resistance, while incorporation in an excessive amount may result in insufficient flowability of the composition, and hence, in poor workability.

In addition to the components as described above, the composition of the present invention may contain components known in the art for an addition curable silicone composition in the range without adversely affecting the objectives of the present invention. For example, any reaction suppressor known in the art which suppresses curing the composition by the addition curing catalyst as the component (C) may be incorporated. Exemplary reaction suppressors include phosphorus-containing compounds such as triphenylphosphine; nitrogen-containing compounds such as tributylamine, tetramethylethylenediamine, and benzotriazole; sulfur-containing compounds; acetylene-based compounds, hydroperoxy compounds; and a maleic acid derivative.

The inhibitory effect of the reaction suppressor on curing the composition differs in degree due to the chemical structure of the reaction suppressor, and hence the content of the reaction suppressor is preferably adjusted to the optimal content for each reaction suppressor. When incorporated in an excessively low amount, long term storage at room temperature may not be realized, while excessive incorporation may inhibit curing of the composition. The reaction suppressor is usually used in an amount of 0.001 to 5 parts by weight per 100 parts by weight of the organopolysiloxane (A).

Exemplary other optional components which may be added include inorganic fillers such as crystalline silica, hollow filler, silsesquioxane, fumed titanium dioxide, magnesium oxide, zinc oxide, iron oxide, aluminum hydroxide, magnesium carbonate, calcium carbonate, zinc carbonate, layered mica, carbon black, diatomaceous earth, and glass fiber; and these fillers surface-hydrophobicized with an organosilicon compound such as an organoalkoxysilane compound, an organochlorosilane compound, an organosilazane compound, or a low molecular weight siloxane compound; silicone rubber powder; and silicone resin powder.

The composition of the present invention may also include additives such as plasticizer, heat resistant additive, thixotropic agent, pigment, dye, and antimold in the range without adversely affecting the objectives of the present invention.

The composition of the present invention may be produced by mixing the above components by a method known in the art. The resulting composition is liquid, and the composition may have a viscosity at 25° C. of 1 to 10,000 Pa·s, and in particular, 5 to 5,000 Pa·s.

In addition, the composition of the present invention has excellent defoamability, and it can be deaerated in a deaerator, and in particular, in a vacuum dearator at a higher efficiency and at a higher precision compared to the composition without the component (D). Accordingly, the molded article (silicone rubber, silicone gel, and the like) comprising the cured product of the composition of the present invention can be produced at a markedly reduced rejection rate.

The composition of the present invention can be cured under the conditions and by the method known in the art, and most typically, the composition of the present invention is cured at 100 to 180° C. for 1 to 60 minutes.

EXAMPLES

Next, the present invention is described in further detail by referring to the Examples and Comparative Examples which by no means limit the scope of the present invention. In the following Examples and Comparative Examples, "parts" means "parts by weight" and the viscosity is the value measured at 25° C. by a rotational viscometer. In the following formulae, Me is methyl group and Vi is vinyl group.

Example 1

100 parts of fluorosilicone, represented by the following average compositional formula (1), which has on average, 80% by mole of its ends capped with vinyldimethylsilyl group and 20% by mole of its end capped with trimethylsilyl group with a viscosity of 700 mPa·s; 0.05 parts of a toluene solution containing 1% by weight of chloroplatinic acid/1,3-divinyltetramethyldisiloxane complex in terms of platinum atom content; 0.1 part of ethynylcyclohexanol; 17 parts of the organohydrogenpolysiloxane represented by the following formula (2); and 0.01 part of dimethylorganopolysiloxane represented by the following formula (3) were mixed, and the air bubbles entrained in the mixture were removed by a vacuum deaerator. It took 10 seconds for complete deaeration. The deaerated composition was cured at 150° C. for 30 hours to obtain a cured product having a penetration value (ASTM, ¼ scale) of 65.

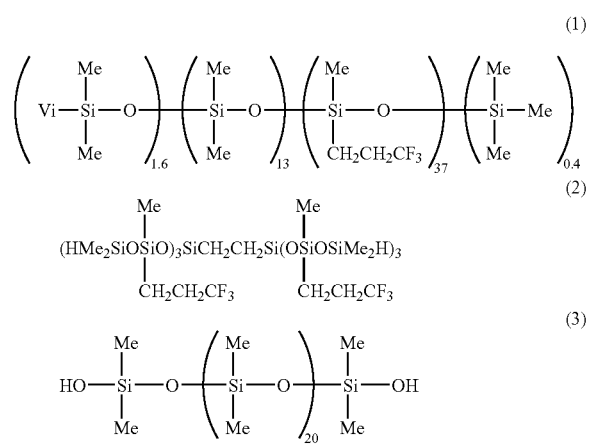

Example 2

100 parts of fluorosilicone, represented by the following average compositional formula (4), which has on average, 55% by mole of its ends capped with vinyldimethylsilyl group and 45% by mole of its end capped with trimethylsilyl group with a viscosity of 2,500 mPa·s; 0.05 parts of a toluene solution containing 1% by weight of chloroplatinic acid/1,3-divinyltetramethyldisiloxane complex in terms of platinum atom content; 0.06 part of ethynylcyclohexanol; 6 parts of the organohydrogenpolysiloxane represented by the following formula (5); and 0.01 part of dimethylorganopolysiloxane represented by the following formula (6) were mixed, and the air bubbles entrained in the mixture were removed by a vacuum deaerator. It took 10 seconds for complete deaeration. The deaerated composition was cured at 125° C. for 30 hours to obtain a cured product having a penetration value (ASTM, ¼ scale) of 65.

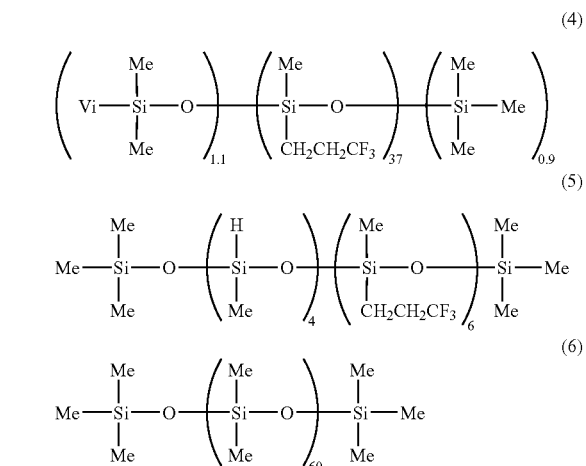

Example 3

To 100 parts of fluorosilicone having its ends capped with vinyldimethylsilyl group represented by the following formula (7) having a viscosity of 5,000 mPa·s was added 30 parts of dry fine powder silica surface-treated with trimethylsilyl group having a specific surface area of 180 m²/g, and the mixture was homogeneously mixed in a kneader to produce mixture (A). To this mixture (A) were added 0.5 parts of tetramethyltetravinylcyclosiloxane, 0.5 parts of iron oxide, and 0.3 parts of cerium oxide, and the mixture was homogeneously mixed by three-roll mill. To this mixture were then added 0.2 parts of a toluene solution containing 1% by weight of chloroplatinic acid/1,3-divinyltetramethyldisiloxane complex in terms of platinum atom content, 3 parts of the organohydrogenpolysiloxane represented by the formula (2) used in Example 1, and 2 parts of the dimethylorganopolysiloxane represented by the formula (6) used in Example 2, and the air bubbles entrained in the mixture were removed by a vacuum deaerator. It took 60 seconds for complete deaeration. The deaerated composition was cured at 150° C. for 1 hour to obtain a cured product having a hardness (measured by durometer A) of 40.

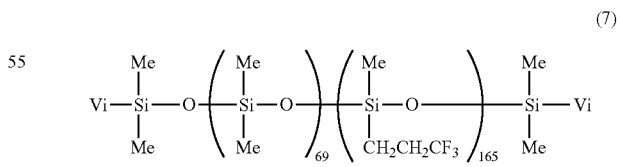

Comparative Example 1

A composition was prepared by the same method of Example 1 except that the 0.01 part of the dimethylorganopolysiloxane was not used. Air bubbles entrained in the resulting mixture was deaerated by a vacuum deaerator. It took 60 seconds for complete deaeration. The deaerated composition was cured at 150° C. for 30 hours to obtain a cured product having a penetration value (ASTM, ¼ scale) of 65.

Comparative Example 2

A composition was prepared by the same method of Example 2 except that the 0.01 part of the dimethylorganopolysiloxane was not used. Air bubbles entrained in the resulting mixture was deaerated by a vacuum deaerator. It took 60 seconds for complete deaeration. The deaerated composition was cured at 125° C. for 30 hours to obtain a cured product having a penetration value (ASTM, ¼ scale) of 65.

Comparative Example 3

A composition was prepared by the same method of Example 3 except that 2 parts of the dimethylorganopolysiloxane was not used. Air bubbles entrained in the resulting mixture was deaerated by a vacuum deaerator. It took 240 seconds for complete deaeration. The deaerated composition was cured at 150° C. for 1 hour to obtain a cured product having a hardness (measured by durometer A) of 40.

Japanese Patent Application No. 2009-059205 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for producing a liquid curable fluorosilicone composition comprising (A) 100 parts by weight of an organopolysiloxane having a viscosity at 25° C. of 100 to 500,000 mPa·s and represented by the following average compositional formula:

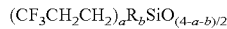

wherein R is a monovalent hydrocarbon group of 1 to 8 carbon atoms with the proviso that at least 0.001% by mole is an alkenyl group, a is 0.1 to 1.0, b is 2.5 to 1.0, and a+b is 1.8 to 3.0, (B) an organohydrogenpolysiloxane containing at least 2 hydrogen atoms bonded to the silicon atom in a molecule in an amount such that number of the hydrogen atom bonded to the silicon atom in the component (B) is 0.5 to 10 per one alkenyl group bonded to the silicon atom in the component (A), and (C) an catalytic amount of an addition catalyst, said method comprising adding (D) a diorganopolysiloxane having a viscosity at 25° C. of 1 to 10,000 mPa·s represented by the following formula:

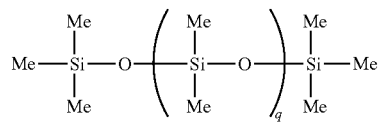

wherein Me is methyl group, q is an integer of at least 1 with the proviso that q is a number such that the viscosity of the composition at 25° C. is in the range of 1 to 10,000 mPa·s as a defoaming agent to the components (A) to (C) in an amount of 0.001 to 5 parts by weight per 100 parts by weight of component (A), and after its addition, defoaming the composition in a defoaming device.

2. The method of claim 1 wherein the defoaming is conducted in a vacuum deaerator.

3. The method of claim 1 wherein the liquid curable fluorosilicone composition has a viscosity at 25° C. of 1 to 10,000 Pa·s.

4. The method of claim 1 wherein the liquid curable fluorosilicone composition has a viscosity at 25° C. of 5 to 5,000 Pa·s.

5. A method of producing a silicone rubber or silicone gel, said method comprising combining
(A) 100 parts by weight of an organopolysiloxane having a viscosity at 25° C. of 100 to 500,000 mPa·s and represented by the following average compositional formula:

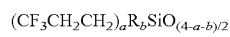

wherein R is a monovalent hydrocarbon group of 1 to 8 carbon atoms with the proviso that at least 0.001% by mole is an alkenyl group, a is 0.1 to 1.0, b is 2.5 to 1.0, and a+b is 1.8 to 3.0,
(B) an organohydrogenpolysiloxane containing at least 2 hydrogen atoms bonded to the silicon atom in a molecule in an amount such that number of the hydrogen atom bonded to the silicon atom in the component (B) is 0.5 to 10 per one alkenyl group bonded to the silicon atom in the component (A),
(C) as a defoaming agent an catalytic amount of an addition catalyst, and
(D) a diorganopolysiloxane having a viscosity at 25° C. of 1 to 10,000 mPa·s and represented by the following formula:

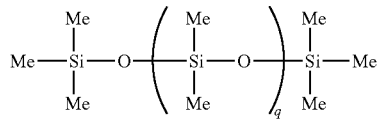

wherein Me is methyl group, q is an integer of at least 1 with the proviso that q is a number such that the viscosity of the composition at 25° C. is in the range of 1 to 10,000 mPa·s, said diorganopolysiloxane being present in an amount of 0.001 to 5 parts by weight per 100 parts by weight of component (A) to form a liquid curable fluorosiicone composition,
defoaming the liquid curable fluorosilicone composition in a defoaming device, and
curing the composition at 100 to 180° C. for 1 to 60 minutes.

6. The method of claim 5, wherein the defoaming is conducted in a vacuum deaerator.

7. The method of claim 5, wherein the liquid curable fluorosilicone composition has a viscosity at 25° C. of 1 to 10,000 Pa·s.

8. The method of claim 5, wherein the liquid curable fluorosilicone composition has a viscosity at 25° C. of 5 to 5,000 Pa·s.

* * * * *